United States Patent [19]
Whitfill, Jr.

[11] 3,784,732
[45] Jan. 8, 1974

[54] METHOD FOR PRE-STRESSING ARMORED WELL LOGGING CABLE

[75] Inventor: William A. Whitfill, Jr., Houston, Tex.

[73] Assignee: Schlumberger Technology Corporation, New York, N.Y.

[22] Filed: Mar. 16, 1971

[21] Appl. No.: 124,689

Related U.S. Application Data

[63] Continuation of Ser. No. 809,357, March 21, 1969, abandoned.

[52] U.S. Cl. .................. 174/108, 174/118, 264/27, 264/103, 264/231
[51] Int. Cl. ... B29d 23/12, H01b 13/00, H01b 7/22
[58] Field of Search ............... 264/103, 229–231, 264/174, 280, 27; 174/108

[56] References Cited
UNITED STATES PATENTS

| | | | |
|---|---|---|---|
| 3,259,675 | 7/1966 | Bowers | 264/103 |
| 3,364,289 | 1/1968 | Campbell | 264/103 |
| 3,436,287 | 4/1969 | Windeler | 264/230 X |
| 3,479,419 | 11/1969 | Hochhauser | 264/174 X |
| 3,113,934 | 12/1963 | Grosman | 264/174 X |
| 2,770,014 | 11/1956 | Nordlin | 264/280 X |

Primary Examiner—Robert F. White
Assistant Examiner—Richard R. Kucia
Attorney—David L. Moseley, Stewart F. Moore and William R. Sherman

[57] ABSTRACT

The particular embodiment described herein as illustrative of the invention relates to method and apparatus for use in manufacturing pre-stressed well logging cables. By use of the present invention, the occurrence of undesirable permanent stretch while the cable is in use will be reduced. The method includes the steps of heating the finished cable to a point substantially less than the melting point of the visco elastic, thermoplastic inner conductor insulators but high enough to make the insulators very pliable, and placing the cable under tension sufficient to deform the conductor insulators. The cable is then cooled to a normal ambient temperature while still under tension. Apparatus capable of performing this method is also disclosed.

9 Claims, 5 Drawing Figures

PATENTED JAN 8 1974　　3,784,732

William A. Whitfill, Jr.
INVENTOR

BY William J Beard
ATTORNEY

William A. Whitfill, Jr.
INVENTOR

BY *William J Bond*

ATTORNEY

METHOD FOR PRE-STRESSING ARMORED WELL LOGGING CABLE

BACKGROUND OF THE INVENTION

This application is a continuation of my copending application Ser. No. 809,357 filed Mar. 21, 1969, and now abandoned.

This invention relates to the manufacture of cable and more particularly to the manufacture of high quality armored well logging cable which is pre-stressed to minimize permanent stretch.

Armored cables used in well logging generally serve a dual purpose. First, the cable provides electrical communication with the well logging tool. Secondly, and equally important, the cable provides a means of continuously measuring the depth of the well logging tool while it is being raised and lowered in the borehole.

It will be appreciated that under normal use of a logging cable, it will expand and contract due to the high temperature and to pressure forces present in the well bore and acting on the cable. However, such thermal expansion and contraction of the cable may be taken into account in depth calibration from the known properties of the cable materials. For the cable to be useful in measuring the depth of the logging tool, however, the so-called "permanent stretch" of the cable must be kept at a minimum since this type of stretch is not predictable in nature. The permanent stretch in a cable may be defined as that change in length of the cable measured at a reference temperature and tension, after the cable has been subjected to a heat and tension cycle, such as would be encountered in a well bore. This stretch may generally be attributed to imperfections in the cable's construction. These imperfections cause spaces or interstices to be present in the cable's interior. When the cable is placed under tension the interstices provide room for expansion and deformation to take place in the cable interior, thus allowing permanent stretch.

It has long been recognized that permanent stretch in a well logging cable is an undesirable feature. To solve this problem, prior art methods of pre-stressing logging cables have been used but with varying degrees of success. Permanent stretch caused by torsional unbalance of the cable has, for example, been compensated for by the method of pre-stressing disclosed in U. S. Pat. No. 3,137,988 which is assigned to the assignee of the present invention. Hot pre-stressing cable using rubber insulation material is disclosed in U. S. Pat. 3,153,696 which is assigned to the assignee of the present invention also. However, due to the requirements of more modern and sophisticated electronic circuitry in use in well logging services, increased requirements are placed upon the electrical characteristics of the cable. For this reason, the prior art cables which utilized rubber insulated electrical conductors have been to a large extent replaced with logging cables utilizing plastic insulated conductors of thermoplastic insulation materials such as ethylene-propylene polymer or the like. While such thermoplastic insulating materials have improved electrical characteristics, unfortunately such materials have a property which can be called a "memory" with respect to shape. That is to say, such materials will tend to regain their original shape after heating and deforming. This property may also be referred to as that of visco elasticity. What is intended herein when using this term with respect to the thermoplastic material (such as polyethelene) used in well logging cable conductor insulators is a shape memory which is not "set" but which may be altered by the application of a heating, deforming, and cooling sequence such as that which will be subsequently described. On the other hand, the prior art insulating materials such as vulcanized rubber did not have this shape memory and cables containing conductors insulated with such prior art materials could be pre-stressed by simultaneously heating and applying tension, as disclosed in the above-mentioned patent, without encountering the difficulties of having the conductor insulators later tend to return to their original shape.

Accordingly, it is an object of the present invention to provide new and improved methods for pre-stressing well logging cables with conductor insulation having a plastic shape memory, or the property of visco elasticity, the present invention avoiding the difficulties of prior art techniques.

A further object of the present invention is to provide an improved method for pre-stressing cable continuously during its manufacture by utilizing a heating and cooling cycle designed to alter the plastic memory of the thermoplastic insulation material surrounding the conductors.

A still further object of the present invention is to provide a novel method for stabilizing the length of electrical well logging cables during the manufacture of the cable in order to minimize changes in length of the cable during use in a well logging environment.

Briefly, in accordance with the objects of the present invention, a novel method for pre-stressing cable utilizing plastic insulated conductors for use in oil well logging services is provided. In order to prevent undesirable permanent stretch in a well logging cable, the method of the present invention provides steps for tensioning the cable during its manufacture and after the final layers of armor are wound about the core of the cable. The tensioning step lengthens the cable and applies inward radial pressure on the cable core to compact the core. While this inward radial pressure is being applied, the cable is heated to a degree where the insulators in the cable core are readily deformable but not flowing. The pressure supplied by the tension forces the outer armored layers of the cable radially inward then deforms the insulators on the inner conductors in such a manner that all the interior interstices between the cable conductors are filled by the deformed insulating layers. The cable is then cooled while the tension is maintained. The cooling process alters the plastic memory of the conductor insulators and forces them to retain their deformed shape, thus the insulators will remain in their deformed state when the tension is removed. This process may be referred to as compacting the central cable core.

The novel features of the present invention are set forth with particularity in the appended claims. The operation, together with further objects and advantages of the invention may be best understood by way of illustration and example of certain embodiments when taken in conjunction with the accompanying drawings.

DESCRIPTION OF THE PREFERRED EMBODIMENT

Figure 1:
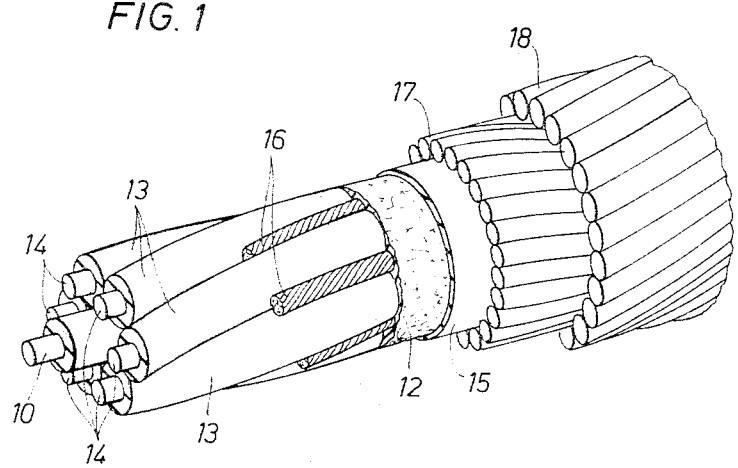
FIG. 1 is a sectional view of a cable of the present invention.
Figure 3:
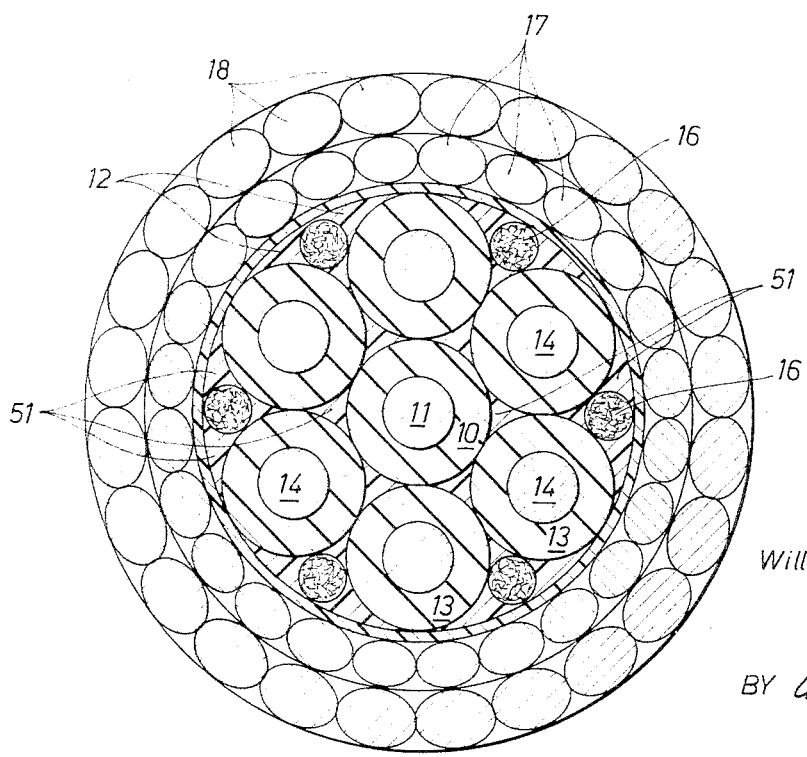
FIG. 3 is an enlarged cross-section view showing the construction of the cable of the present invention prior to the pre-stressing process.

Referring now to FIGS. 1, and 3 the overall construction of a seven conductor well logging cable in accordance with the principles of the present invention is shown. The center conductor 11 is surrounded by an extruded insulation 10 made of a thermoplastic ethylene-propylene polymer. Although not all types of polypropylene have the property of visco elasticity it will be understood herein that the materials used in well logging cable conductor insulators do possess this property and that the pre-stressing steps to be described hereafter act to alter the shape memory of such conductor insulators. Outer conductors 14 are of the same construction as the center conductor and also have ethylene-propylene polymer insulator layers 13. Filler layer 12 is a cured, solid material applied simultaneously as the outer conductors are cabled about the inner conductor. This material is applied as a slurry which is picked up as the conductors are cabled. This material may be DPR (depolymerized rubber) or the like and is self curing and sets into a solid state. Cotton yarn 16 or the like is simultaneously wound about the inner core to partially fill the external interstices 51 between the outer conductors 14. Overlying this subassembly is a layer 15 which may be a Dacron tape material or the like, wrapped about the inner core in order to facilitate handling during production. The inner construction of the cable is surrounded by two layers of armor 17 and 18. These armor wire layers are cable-wound with opposite lays, i.e., one layer has a left-hand lay, the other a right-hand lay, and differing pitches in the manner disclosed in U. S. Pat. No. 3,137,988, in order to provide a torque-balance cable. These armor layers perform the load bearing function of the cable and further serve to protect the inner core.

Figure 4:
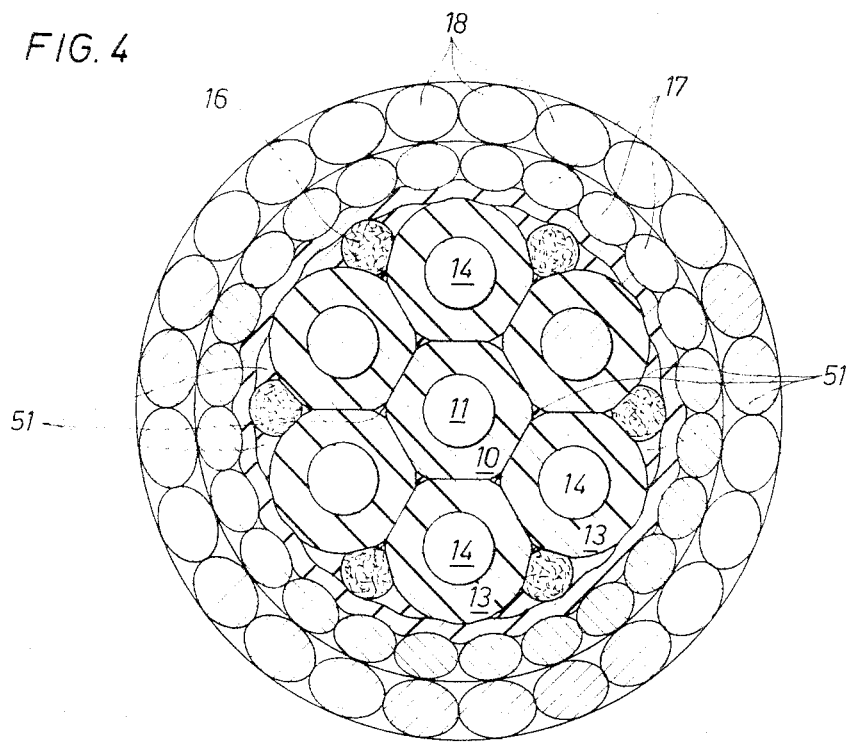
FIG. 4 is an enlarged cross-section view showing the construction of the cable of the present invention after prestressing.

Referring still to FIG. 3, a cross-sectional view of the cable of FIG. 1 is shown to illustrate the symmetrical distribution of the cable conductors prior to the application of the pre-stressing method of the present invention. The conductors in the cable core being of a round cross section leave gaps or interstices 51 between the conductors. When longitudinal tension is applied to the cable, the outer armor, which is spiral wrapped as indicated by its elliptical cross section in FIG. 3, tends to unwind, and hence exerts inward radial forces upon the cable core and forces the insulators of the conductors to deform and expand into the interstices of the cable. This may be further appreciated by reference to FIG. 4 which shows a cross section of the cable when placed under tension. The straightening out of the armor, as may be appreciated by the decreased eccentricity of the elliptical cross section of the armor strands, exerts an inward radial force on the cable core. This force compresses the core, deforming the conductor insulators 10 and 13 so as to fill all remaining interstices 51.

Even though filler material 12 is applied during the manufacturing process, this does not prevent the insulators from deforming and filling up the interstices because the filler material does not completely fill all the interstices in the cable and, moreover, the filler is compressible.

Prior art cables utilizing rubber insulators over the conductors could be pre-stressed by heating the cable to the point where the rubber was readily deformable and then placing the cable under tension. This would deform the rubber to fill the internal interstices and, since the rubber material did not have a shape memory it would retain the deformed shape when the tension was released. The thermoplastic insulation of ethylene-propylene polymer or the like in use on the improved logging cables, however, have this memory characteristic or property of visco elasticity which, if the same pre-stressing technique as utilized with the rubber covered conductors were used, would cause the conductor insulator ultimately to reassume its circular cross section upon release of the tension from the cable.

In a typical well logging application, the cable passes through a heating and cooling cycle while under tension. That is, when the cable is lowered into the well, it is gradually heated under tension, i.e., the weight of the sonde, and when it is removed from the well, it is gradually cooled under tension. The tension placed on the cable by the logging sonde can cause the outer armor to exert an inward radial force, thus deforming the cable conductors as the logging sonde is lowered into the well. However, as the sonde is withdrawn from the well, the insulators of the conductors are held in their deformed state while the cable is cooled. This cooling of the cable under tension can have the effect of altering the memory cycle of the ethylene-propylene polymer outer conductor insulators and, hence, the conductor insulators would retain their deformed state. When this happens in the borehole, of course, undesirable permanent stretch is introduced into the cable as the inner diameter of the central cable construction is reduced. Consequently the cable is no longer calibrated as to length.

The recognition that this effect happens in the use of the cables in well logging has led to the method and apparatus for manufacture of the cable of the present invention which duplicates the worst possible conditions to be encountered in well bore use, and hence, pre-stresses the cable so as to avoid undesirable permanent stretch when the cable is later used in the logging operation.

Figure 2:
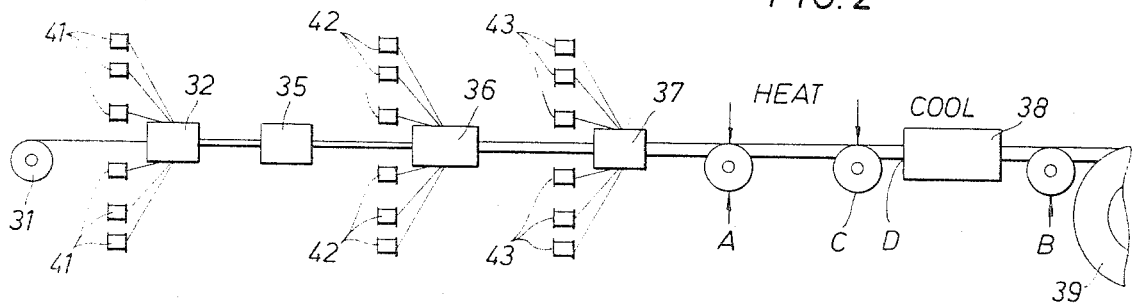
FIG. 2 is a schematic diagram showing a production line for producing the cable of the present invention.

Turning now to FIG. 2, a production line for producing the armored cable for well logging operations and utilizing the pre-stressing method of the present invention is illustrated schematically. The single center conductor is fed from the supply spool 31 through a cabling machine 32 which cable-wraps the other insulated conductors furnished from supply spools 41 about the center conductor in the symmetric configuration shown in FIG. 3. Simultaneously, the cotton filler yarn 16 is wrapped to partially fill the external interstices between the outer conductors. As the cable progresses through the cabling machine 32 the conductor passes through a slurry of filler material 12. The conductor 13 and cotton fillers 16 pick up some of this slurry and it thus becomes impregnated into the structure of the cable core. Filler material 12 may be a self curing filler such as depolymerized rubber (D.P.R.) or the like. The central cable core is then wrapped with a Dacron tape layer 15 by wrapping apparatus 35.

At this point, the cable core is complete and the cable is ready to receive the outer layers of armor wires. The central cable core passes through a first armor layer wrapping machine 36 and then through a second armor layer applicator 37. These machines wrap armor wires from supply spools 42 and 43 with opposite lays and differing pitches to provide a torque balanced construction. Now the cable construction is complete and the prestressing process to eliminate the undesirable permanent stretch is commenced.

Tension is applied to the cable between points A and B which may be the points where the cable enters or exits from motor-driven capstans or the like, and electrical current is passed through the outer armor of the cable between points A and C to heat the central core to a temperature of approximately 250° F. This temperature is below the melting point of the conductor insulators, however, it will cause the visco elastic ethylene-propylene polymer conductor insulator material to be readily deformable. The tension in the cable causes the outer armor to press radially inward on the cable core thus deforming the conductor insulators in the manner illustrated in FIG. 4 into a hexagonal or other irregular shape so as to fill any interstices 51 remaining between the cable conductors completely. While the cable is still under the tension between points A and B, it is passed through a cooling trough 38 which is long enough to contain the cable for a length of time sufficient to reduce the temperature to approximately 70°F, thus altering the plastic memory of the ethylene-propylene polymer conductor insulators so that they will not return to their formerly rounded shape. Finally, the cable is taken up on a takeup reel 39 (shown partially obscured) and is ready for use.

Figure 5:
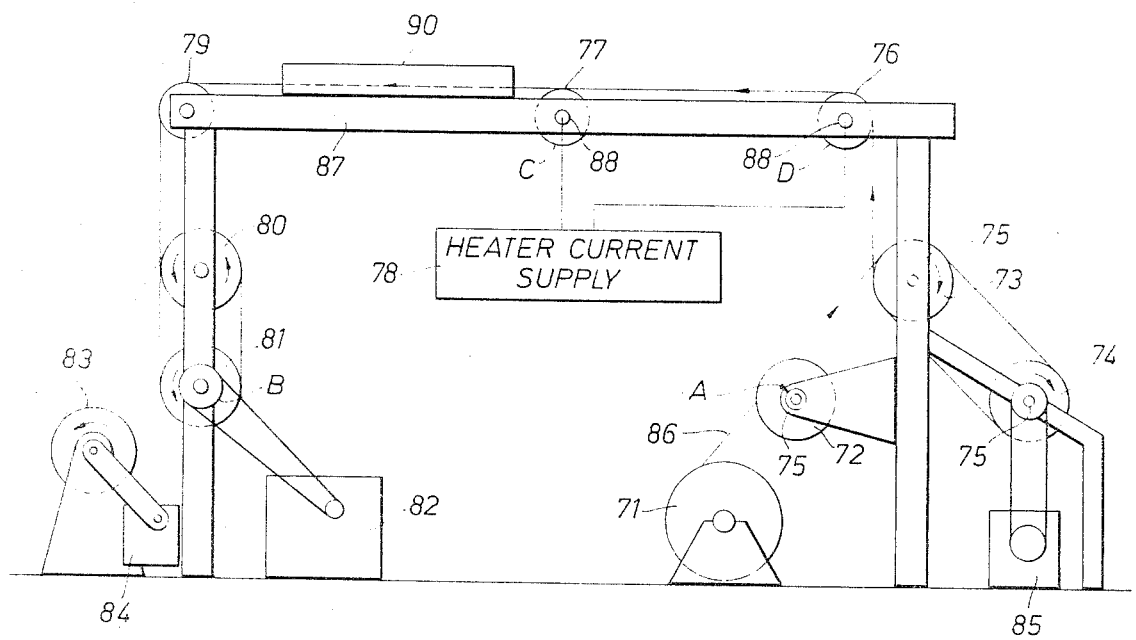
FIG. 5 is a more detailed schematic drawing showing the novel pre-stressing apparatus used in the present invention for altering the plastic memory of the cable materials.

Referring now to FIG. 5, an apparatus for pre-stressing a cable and for altering the plastic memory of the thermoplastic insulator is shown in more detail but still schematically. Finished armored cable 86 is paid out from a source such as a supply spool 71 or from a cable construction line in a continuous manner. The cable passes several turns around a capstan 72 and then passes several turns around another capstan 73. From capstan 73, the cable is passed several turns around capstan 74. Motor 85 drives the capstan 74 and turns capstans 72 and 73. Capstans 72, 73 and 74 are provided with adjustable friction drag brakes 75. Motor 82 drives capstan 81 and provides the main part of the motive force to move the cable through the system. After leaving capstan 74, the cable passes over sheaves 76 and 77 and parallel to the upper supporting member 87 of the apparatus. Heater current is supplied by heater current supply 78 through commutators 88 to sheaves 76 and 77. The current is coupled to the cable armor by conduction to provide a heating source for bringing the temperature of the conductor insulators interior to the cable up to a temperature of about 250°F. After the cable passes around sheave 77, it is routed through cooling trough 90 and over sheave 79 and makes several turns each around capstans 80 and 81. The cable is then taken up on take-up reel 83, which is powered by motor 84.

The operation of the system may be described as follows. Motors 82, 84 and 85, which may be tied together with a servo type control system to maintain a sustained rate of output from the system, power the cable through the system. Motor 82 which furnishes most of the motive force is driven at a faster rate than motor 85. This, coupled with the braking action of the variable friction drag brakes 75 on capstans 72, 73 and 74, furnishes the degree of tension necessary to compress the inner core of the cable and to deform the inner conductors. This tension may for example, be approximately 6,000 lbs. which is less than two thirds of the breaking strength of the cable but greater than tension encountered in normal well logging usage. The cable may be thought of as entering the pre-stressing system at capstan 72 which corresponds to point A in the diagram of FIG. 2. The cable is under this tension from capstan 72 until it leaves capstan 81 which corresponds to point B of FIG. 2. While the cable is under tension, it first passes between sheaves 76 and 77 where the heating current is applied to the outer armor layers to bring the temperature of the inner core to the desired point of deformation but below the melting point (325°F) of the ethylene-propylene polymer insulating material of the inner conductors. At this point, due to the tension in the cable, the inner core is compressed and the conductor insulators are deformed to completely fill the interstices within the cable core. Then the cable is cooled in the cooling trough 90 which contains a suitable coolant, such as water or the like, while the cable is still under tension and the conductor insulator deformed. Cooling the cable while it remains under tension in cooling trough 90 thereby alters the plastic memory of the conductor insulator material and provides a cable core in a pre-stressed condition. That is the plastic memory of the conductor insulator is now changed so that the insulators tend to remain in their deformed shape rather than return to their previously round state when the tension is released. The cable then passes over sheave 79 and out the system of capstans 80 and 81 onto the take-up reel 83.

It will be appreciated from the foregoing discussion that while this is a continuous process which is performed during the manufacture of the cable for pre-stressing, the process simulates the actual conditions which will be encountered by logging cable in the well bore at least to the degree of securing the necessary pre-stressing conditions to avoid permanent stretch in the cable when it is utilized in the well bore.

Summarizing, the method steps involved in the pre-stressing process may be outlined as follows:

1. Tensioning a cable to be pre-stressed to approximately 6,000 lbs. at approximately 70° F.
2. Heating the tensioned cable to approximately 250°F to deform the inner conductor insulators of the cable.
3. Cooling the cable to approximately 70°F while the conductors are still in their deformed state to alter the plastic memory of the conductor insulators. 4. Relaxing the tension in the cable and spooling it up on a take-up reel.

While a particular embodiment of the present invention has been shown and described, it is apparent that changes and modifications may be made without departing from this invention and its broader aspects; and, therefore, the aim in the appended claims is to cover all such changes and modifications as fall within the true spirit and scope of this invention.

What is claimed is:

1. In the method of manufacturing a well logging cable comprising a central cable core, a covering layer of flexible tape material wound about said central core, an inner armor layer of closely spaced helically wound metallic strands disposed about said central core and said covering layer, and an outer armor layer of closely spaced helically wound metallic strands disposed about said inner armor and inclined opposite to said inner strands, said central cable core containing a plurality of outer conductors disposed around a central conductor, each said conductor being insulated with a coating of viscoelastic thermoplastic insulation material, the improvement whereby said central cable core is permanently compacted, substantially eliminating the interstices between adjacent insulated conductors thereof, and the well logging cable is thereby made to exhibit essentially no irreversible permanent stretch when subjected to the tensions and temperature cycles encountered in logging a well, which improvement comprises the steps of:

Taking the cable, after the armor layers have been wrapped around said central core, and passing said cable between a payout means and a takeup means under a substantially constant tension less than about two-thirds the breaking strength of said cable but sufficient to cause said armor layers to elongate and thereby supply inward radial compressive forces on said central cable core;

as said cable passes between said payout and said takeup means, heating a portion of the thus-tensioned cable to a degree sufficient to cause said thermoplastic insulation material in such heated portion to deform under said inward radial compressive forces and substantially to fill the previously existing interstices between the insulated conductors of said central cable core; and before the heated portion of the cable reaches the takeup means and while maintaining said tension, cooling said portion to ambient conditions.

2. The method of claim 1 wherein the step of heating the tensioned cable is performed by passing an electric current through the outer armor layers comprising a portion of the structure of the cable.

3. The method of claim 1 wherein the step of cooling the tensioned cable is performed by continuously passing the tensioned cable through a trough containing a coolant material.

4. In the method of manufacturing a well logging cable comprising a central cable core, a covering layer of flexible tape material wound about said central core, an inner armor layer of closely spaced helically wound metallic strands disposed about said central core and said covering layer, and an outer armor layer of closely spaced helically wound metallic strands disposed about said inner armor and inclined opposite to said inner strands, said central cable core containing a plurality of substantially cylindrical conductors, each said conductor being insulated with a substantially uniform thickness of thermoplastic ethylene-propylene polymer insulation material, the improvement whereby said central cable core is permanently compacted, substantially eliminating the interstices between adjacent insulated conductors thereof, and the well logging cable is thereby made to exhibit essentially no irreversible permanent stretch when subjected to the tensions and temperature cycles encountered in logging a well, which improvement comprises the steps of:

passing the cable between a payout means and a takeup means under a substantially constant tension less than about two-thirds the breaking strength of said cable but sufficient to cause said armor layers to elongate and thereby supply inward radial compressive forces on said central cable core;

heating a portion of the thus-tensioned cable, as it passes bween said payout and said takeup means, to a temperature below the melting point of said ethylene-propylene polymer but sufficient to cause said ethylene-propylene polymer to deform under said inward radial compressive forces and to fill substantially the previously existing interstices between the insulated conductors of said central cable core; and thereafter, while maintaining said tension and before said heated portion reaches said takeup means, passing said heated cable portion through a cooling trough long enough to reduce the cable temperature to ambient conditions.

5. The method of claim 4 wherein the tension between the payout means and the takeup means is maintained at approximately 6,000 pounds.

6. The method of claim 4 wherein the tensioned cable is heated by passing an electric current through the outer armor layers of said cable as the cable passes from said payout means to a point C intermediate between said payout means and said takeup means.

7. The method of claim 6 wherein the cable is heated sufficiently to raise the temperature of the conductor insulation to approximately 250°F.

8. The method of claim 7 wherein the cable is cooled by passing said cable through a trough of coolant material located between intermediate point C and said takeup means and long enough to lower the temperature of the conductor insulation of said cable to approximately 70°F while said cable moves through said trough.

9. A well logging cable manufactured by the method of claim 8.

* * * * *